US 6,535,308 B1

(12) United States Patent
BuAbbud et al.

(10) Patent No.: US 6,535,308 B1
(45) Date of Patent: Mar. 18, 2003

(54) METHOD AND APPARATUS FOR CONVERTING ELECTRICAL SIGNALS AND OPTICAL SIGNALS FOR BIDIRECTIONAL COMMUNICATION OVER A SINGLE OPTICAL FIBER

(75) Inventors: George H. BuAbbud, South Lake, TX (US); Mahlon D. Kimbrough, Bedford, TX (US); Mark W. Hastings, Weatherford, TX (US)

(73) Assignee: Marconi Communications, Inc., Cleveland, OH (US)

( * ) Notice: Subject to any disclaimer, the term of this patent is extended or adjusted under 35 U.S.C. 154(b) by 0 days.

(21) Appl. No.: 09/249,733

(22) Filed: Feb. 12, 1999

(51) Int. Cl.[7] .................. H04B 10/00; H04B 10/04; H03C 3/00; H03D 3/00
(52) U.S. Cl. ............... 359/113; 359/152; 359/123; 372/101; 372/102; 372/103
(58) Field of Search ................. 359/152, 113, 359/181, 123; 702/191; 372/34; 327/102–103; 709/253

(56) References Cited

U.S. PATENT DOCUMENTS

| | | | | |
|---|---|---|---|---|
| 4,168,427 A | * | 9/1979 | Hubbard | 359/152 |
| 4,317,232 A | | 2/1982 | Pickett et al. | |
| 4,435,764 A | * | 3/1984 | El-Gohary | 364/200 |
| 4,687,957 A | * | 8/1987 | O'Neil, II | 307/311 |
| 4,691,385 A | | 9/1987 | Tupman | |
| 4,726,676 A | * | 2/1988 | Maslaney et al. | 356/73.1 |
| 5,075,791 A | | 12/1991 | Hastings | 359/135 |
| 5,119,223 A | * | 6/1992 | Panzer et al. | 359/123 |
| 5,255,111 A | * | 10/1993 | Kwa | |
| 5,349,462 A | * | 9/1994 | Defranco et al. | 359/152 |
| 5,526,160 A | | 6/1996 | Watanabe et al. | |
| 5,602,860 A | * | 2/1997 | Masonson | 372/25 |
| 5,953,690 A | * | 9/1999 | Lemon et al. | 250/214 C |
| 6,282,007 B1 | * | 8/2001 | Roberts | 359/138 |

FOREIGN PATENT DOCUMENTS

| | | | | |
|---|---|---|---|---|
| EP | 0350207 | 6/1989 | | H04B/10/20 |
| EP | 350207 | 1/1990 | | |
| JP | 55005508 | 6/1978 | | H04B/9/00 |

OTHER PUBLICATIONS

Patent Abstracts of Japan, Titled: "Optical Data Communication System", publication No. 55 005508, published Jan. 16, 1980 (Applicant: Agency of Ind. Science and Technology).

\* cited by examiner

*Primary Examiner*—Jason Chan
*Assistant Examiner*—David Payne
(74) *Attorney, Agent, or Firm*—Jones, Day, Reavis & Pogue

(57) ABSTRACT

Circuitry for controlling a diode optically coupled to an optical fiber suitable for transmitting digital light signals therethrough. The circuitry includes a temperature compensated driver when operating in the transmit mode and receiving circuitry for conditioning and amplifying electrical signals generated by the diode when it operates in a photodetection mode. A sweep circuit is provided for isolating amplifiers in the receiving circuitry and for discharging residual charge left in the diode during the transmission mode thereby reducing the signal-to-noise ratio.

18 Claims, 6 Drawing Sheets

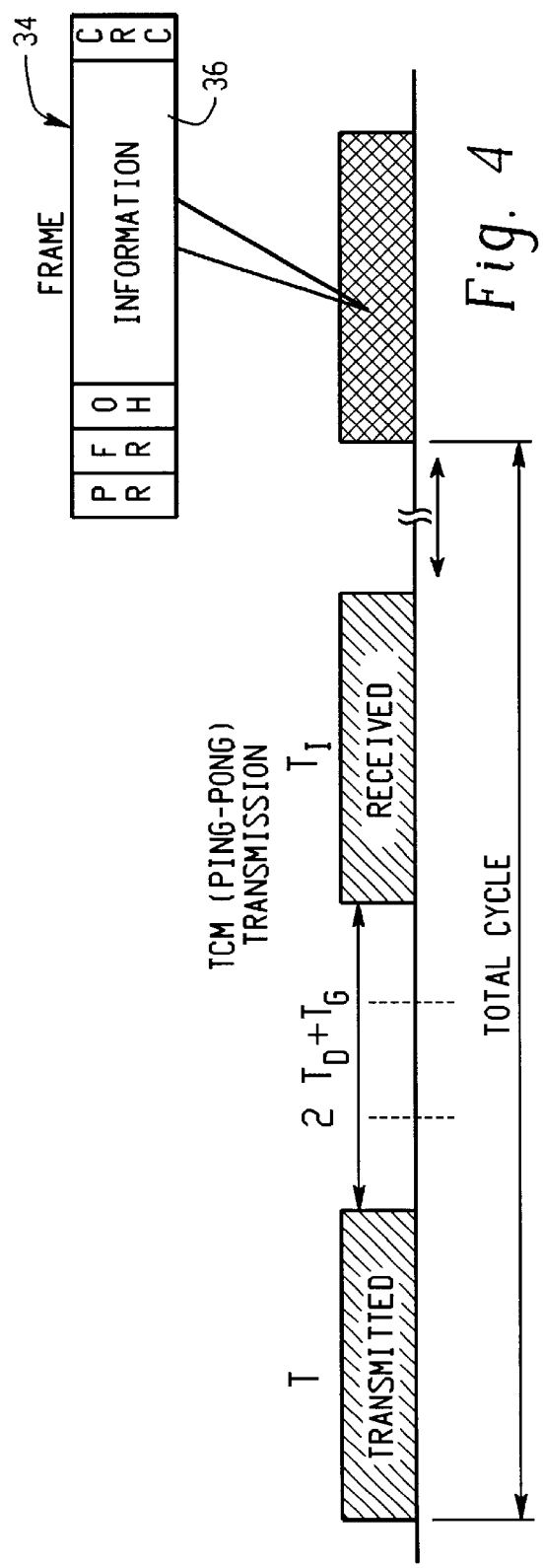
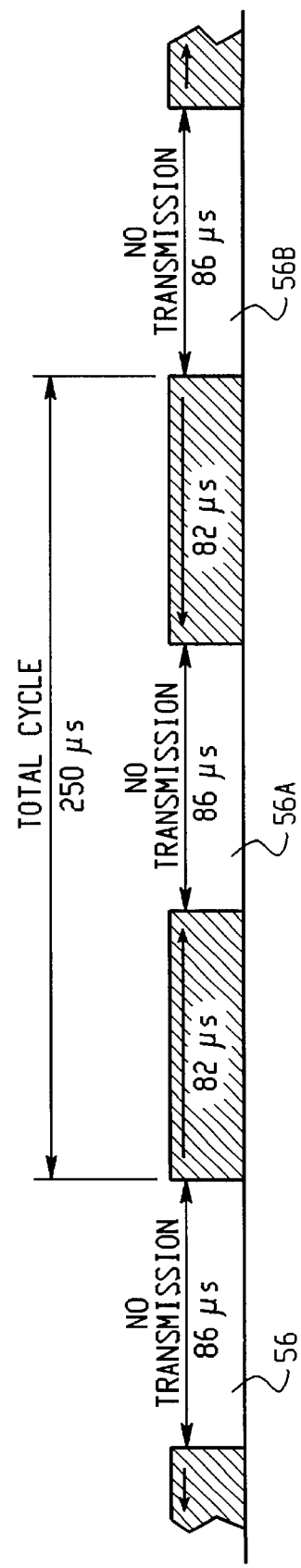
Fig. 4 (PRIOR ART)
Fig. 6

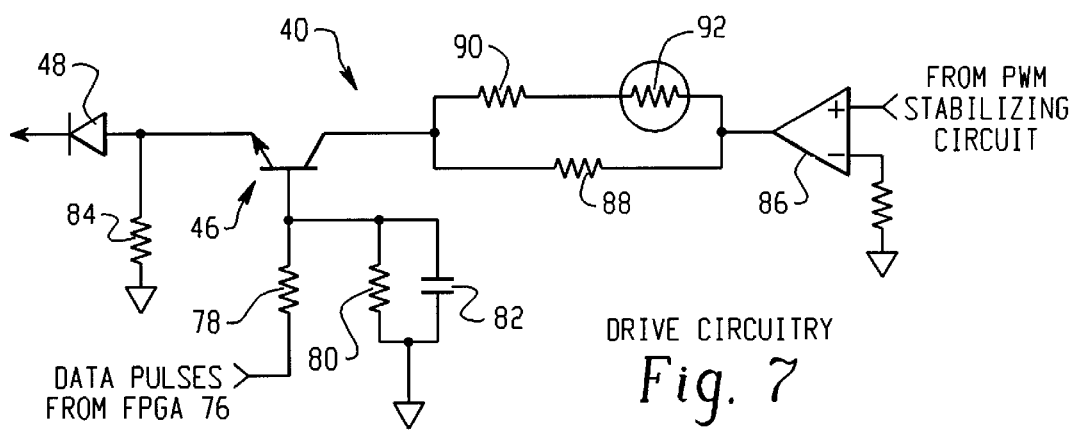
Fig. 7 DRIVE CIRCUITRY
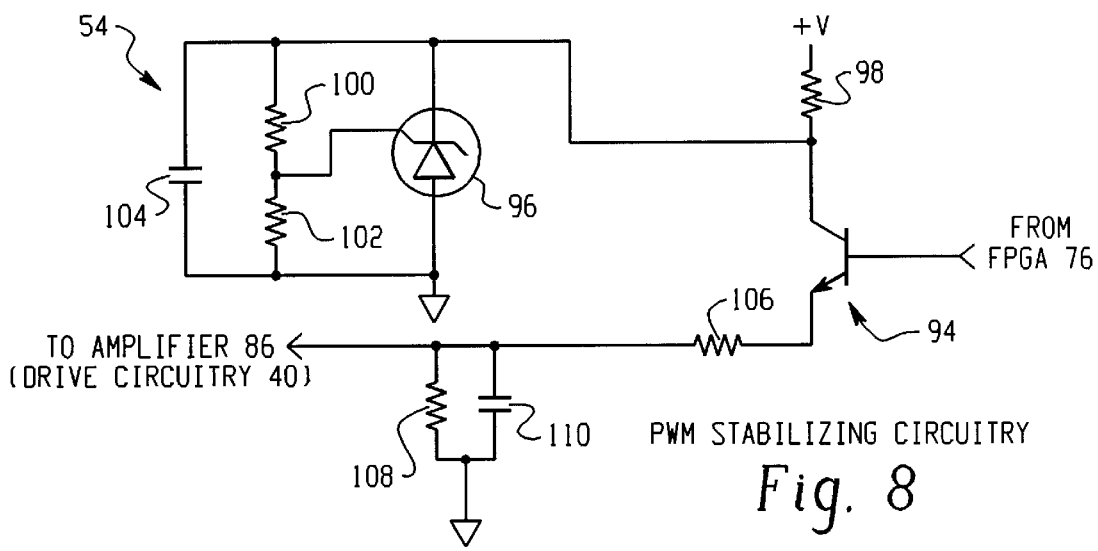
Fig. 8 PWM STABILIZING CIRCUITRY
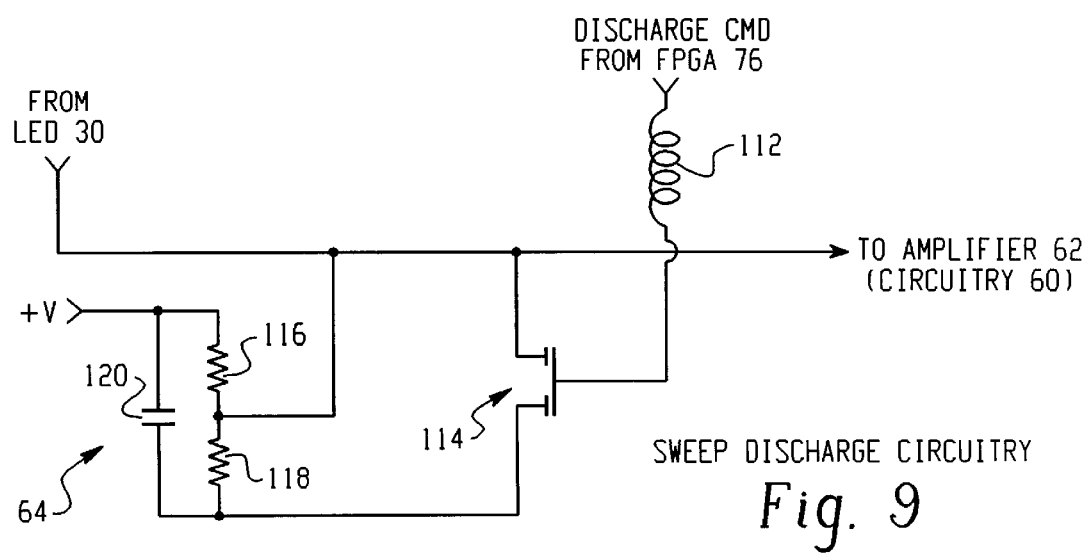
Fig. 9 SWEEP DISCHARGE CIRCUITRY

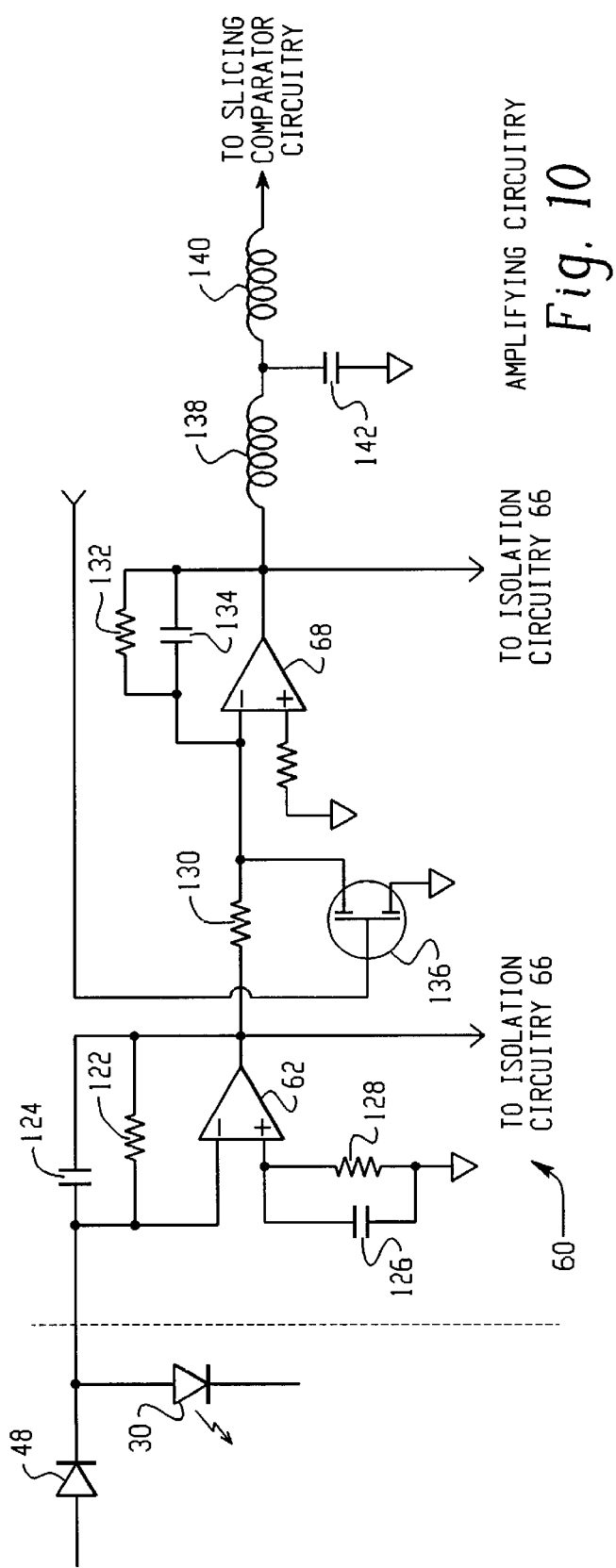
Fig. 10 AMPLIFYING CIRCUITRY
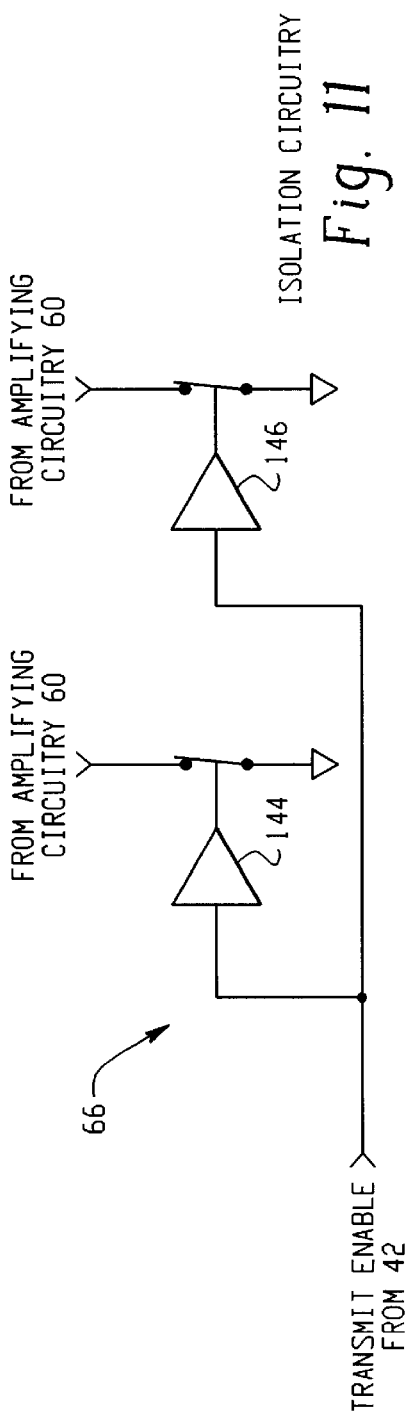
Fig. 11 ISOLATION CIRCUITRY

METHOD AND APPARATUS FOR CONVERTING ELECTRICAL SIGNALS AND OPTICAL SIGNALS FOR BIDIRECTIONAL COMMUNICATION OVER A SINGLE OPTICAL FIBER

BACKGROUND OF THE INVENTION

1. Field of the Invention

The present invention relates to methods and apparatus for communicating over a single optical fiber communications channel, and more specifically, to methods and apparatus for converting electrical signals to optical signals and optical signals to electrical signals by a single laser diode which acts as both a light-emitting diode and a photodetection diode.

2. Description of Related Art Including Information Disclosed Under 37 CFR 1.97 and 1.98

The telecommunications industry is using more and more optical or light fibers in lieu of copper wire. Optical fibers have a extremely high bandwidth, thereby allowing significantly more information to be carried than can be carried by a copper wire.

Of course, modern communication systems require bidirectional communications, where each station on a communications channel can both transmit and receive. This is true, of course, whether using electrical wiring or optical fibers as the transmission medium. Early telephone communication systems solved this need simply by providing separate copper wires for carrying the communications in each direction. Some early attempts at using optical fibers as a transmission medium followed this example and also used two different optical fibers 10 and 10A for carrying the communications in each direction as illustrated in the prior art FIG. 1. As shown, fiber 10 is connected by an optical coupler 12 to an LED (light-emitting diode) 14 at one end and by optical coupler 16 to a PD (photodetection diode) 18 at the other end. Similarly, but in reverse, fiber 10A is connected by an optical coupler 16A to PD 18 at one end and by optical coupler 12A to LED 14 at the other end.

However, because of the extremely high bandwidth available for use by an optical fiber a single fiber is quite capable of carrying communications in both directions. In fact, as will be appreciated by those skilled in the art, by using modern multiplexing techniques a single fiber has sufficient bandwidth to carry a large number of different communications by different customers in both directions at the same time. One such technique is (WDM) (wavelength divisional multiplexing) which is shown in the prior art FIG. 2 and uses different wavelengths for each direction of travel. Components in FIG. 2 and subsequent figures which operate the same as shown in FIG. 1 carry the same reference numbers. In the embodiment shown in FIG. 2, a central office 20 is connected to an RDT (remote digital terminal) 22 by a single optical fiber 10B. As shown, the central office includes a light-emitting diode 14 optically connected to fiber optics 10 by optical coupler 12 for converting electrical signals to optical signals and a photodetection diode 18 optically connected to optical fiber 10B by coupler 16A for converting optical signals to electrical signals. The fiber optics 10 and fiber optics 10B are each connected to a wavelength division multiplexor 24 which in turn is connected by optical coupler 26 to optical fiber 10B. This arrangement is duplicated at the RDT 22 by light-emitting diode 14A, photodetection diode 18A, and wavelength division multiplexor 24A. It will, of course, be appreciated that although the figure is shown as providing communications between a central office 20 (station 1) and a remote terminal office 22 (station 2), the communications system could be used for providing communications between any two types of stations such as, for example, two central offices, two remote terminal offices, or between a remote office and an individual user's location etc. A typical communication system using an LED and a PD with a single optical fiber is disclosed in U.S. Pat. No. 5,075,791 entitled "Method and Apparatus for Achieving Two-Way Long Range Communication over an Optical Fiber", issued to Mark W. Hastings, and incorporated in its entirety hereby by reference.

Yet another technique for using a single optical fiber 10B is illustrated in the prior art FIG. 3. The illustrated figure is referred to as TCM (time compression multiplexing) and is sometimes referred to as a "ping-pong" system. The system uses a single optical fiber 10 and a single diode 30 and 30A at each end connected by optical coupler 32 and 32A, respectively, for both converting electrical signals to optical signals and for receiving optical signals and converting those optical signals to electrical signals. TCM systems have the obvious advantage of requiring fewer components. Unfortunately, diodes presently available for such dual use while having a high efficiency of converting electrical signals to optical signal for transmission in one direction down the optical fiber, are not as efficient at receiving the very low-level optical or light signal from the fiber and converting that optical signal to an electrical signal. This is especially true after the significant attenuation the optical signal will experience as it travels down the optical fiber. Consequently, present systems using a signal diode for both transmitting and receiving are often noisy and ineffective.

Thus, it would be advantageous to provide a signal diode system which can receive the low amplitude optical signal and make the conversion to an equivalent electrical signal amplifying the electrical signal and still maintain a low signal-to-noise ratio.

SUMMARY OF THE INVENTION

The present invention addresses the above concerns and disadvantages of prior art systems for using a signal diode for both transmitting and receiving optical signals.

The circuitry of a preferred embodiment of the invention for using a signal diode connected to an optical fiber for both receiving and transmitting digital signals provided by a drive unit connected to the diode and making up a part of the circuitry of this invention is described. The drive unit receives electrical digital input signals such as PWM (pulse-width modulated) signals from a suitable digital source and then stabilizes parameters of these signals such as the voltage level and the duty cycle of the PWM signal before providing the signal to a current amplification device which then provides the amplified current signal to drive the diode. A preferred embodiment of the invention further includes a temperature compensation circuit for maintaining the output level of the drive circuit within acceptable limits even with temperature variations. The optical fiber connected to the circuitry is, of course, suitable for transmitting digital light signals in both directions. The diode is optically coupled to the optical fiber and is controlled by the inventive circuitry so as to have a receiving mode and a transmitting mode. In the receiving mode, the diode receives the digital light signals from the optical fiber and generates electrical digital signals representative of the received digital light signals. In the transmitting mode, the diode is electrically connected to the electrical digital signal source and receives the electrical digital signals and generates optical or light digital signals representative of the electrical digital signals for transmission by the optical fiber. A preferred diode for both receiving and transmitting is an ELED (edge-emitting light-emitting diode). The electrical signals generated by the diode in response to receiving the optical digital signals are provided to a receiver circuit which is connected to the diode electrical outputs. The receiver circuit amplifies and conditions the electrical signals from the diode in a manner such that the signals are suitable for being provided as electrical digital output signals for communication purposes. In a preferred embodiment, a receiver circuit has amplifying circuitry which includes an automatic gain control amplifier and further includes a slicing comparator for calculating the slicing level of the output signal. Since the diode includes a single set of input/output leads, it will be appreciated that the drive circuit and the receive circuit of the diode are electrically connected. Consequently, when the drive circuit is providing drive current to the diode, amplifiers in the receiving circuit may be driven to saturation. Further, it will take a finite time period for the junction of the diode to discharge after receiving the last electrical transmission pulse. Consequently, there is further included an isolation circuit and a sweep circuit for removing residual charge from the diode subsequent to the diode being in a transmission mode and prior to the diode operating in the receiving mode. According to one embodiment, such isolation is accomplished by a switching circuit which disconnects the amplifying circuit at two locations during the transmission mode.

Thus, the present invention presents a number of advantages over prior art single diode circuits.

BRIEF DESCRIPTION OF THE DRAWINGS

These and other features of the present invention will be more fully disclosed when taken in conjunction with the following Detailed Description of the Preferred Embodiment(s) in which like numerals represent like elements and in which:

FIG. 4 is a timing diagram of a typical prior art TCM or ping-pong transmission/receive technique used by a single-fiber system;

FIG. 6 is a timing diagram showing bursts of data traveling in both directions; and FIGS. 7–13 show details of the circuitry components of FIG. 5.

DESCRIPTION OF THE PREFERRED EMBODIMENT(S)

Figure 1:
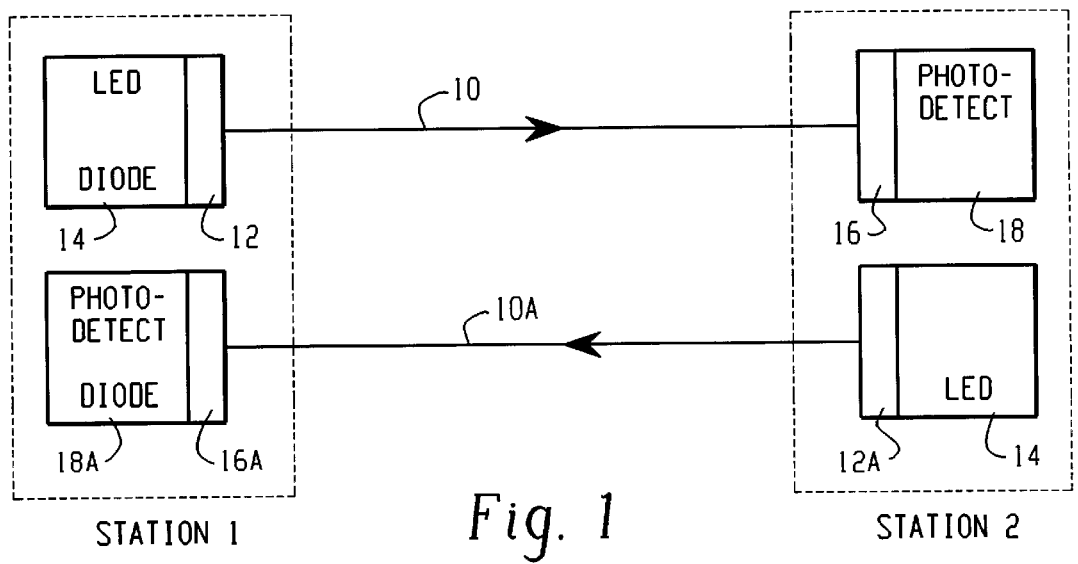
FIG. 1 is a block diagram of a prior art fiber optical communication system using two fibers to obtain bidirectional communication.
Figure 2:
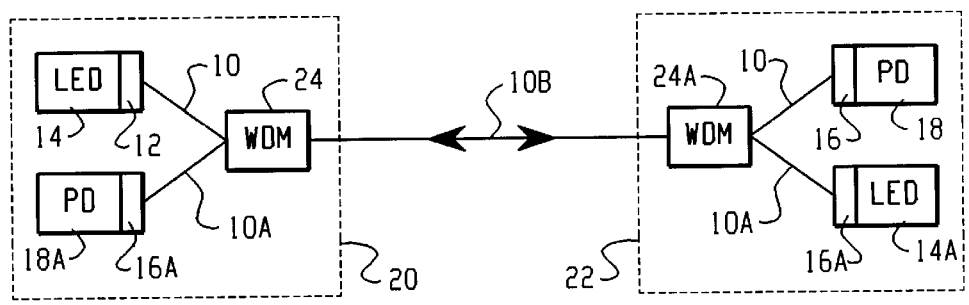
FIG. 2 is a prior art block diagram of a fiber-optic communication system using a single transmission fiber having a light-emitting diode and photodetection diode at each end of the fiber.
Figure 3:
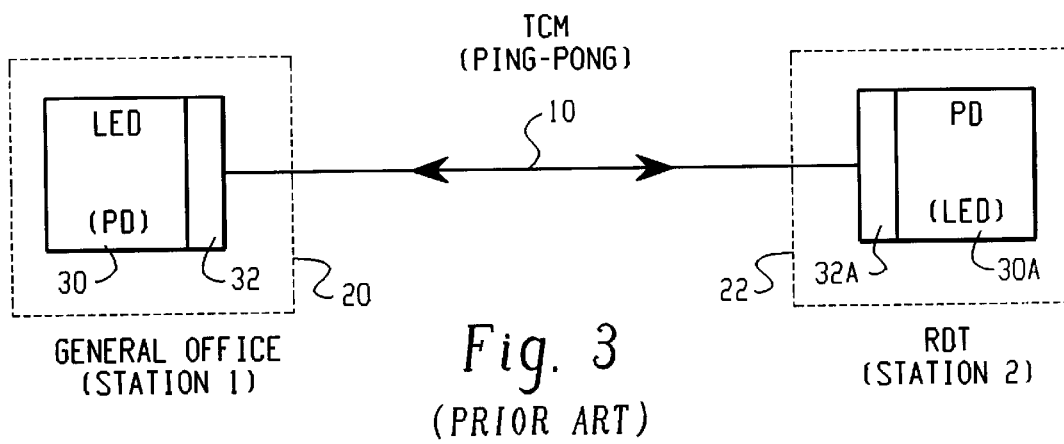
FIG. 3 is a prior art block diagram of a fiber-optical communication system using a single fiber and a single transmit/receive diode at each end suitable for TCM or ping-pong type of transmission.

Referring now to prior art FIGS. 3 and 4, the typical operation of a TCM (time compression modulation) system will be discussed. TCM is a multiplexing method for bidirectional transmission. As shown in the timing chart of FIG. 4, $T_D$, $T_G$, and $T_I$ are the delay time, the guard time, and the information time, respectively. When one diode is emitting light in the transmission mode, the diode at the other end is detecting light and is in the receiving mode (ping-pong transmission). An example of a typical data frame 34 used in these systems is shown in data frame 34. Preamble bits (PR), frame synchronous bits (FR), and overhead bits (OH) for housekeeping are inserted as a header of information bits, and cyclic redundancy check (CRC) bits are located at the end of the information bits 36. The preamble bits carry no information and are only used for the stable performance of a receiver. The information 36 is carried in the rest of the data frame.

To transmit, a light source such as diode 30 at a central office location 20 emits data in a light burst for less than half of the burst cycle, $T_C$, and is received by diode 30A at RDT (remote digital terminal) 22 which is acting as a photodetection diode. Diode 30A then acts as a light-emitting diode during the second half of the cycle and its output light pulses are received at diode 30, which is now acting as a photo-detection diode. Since signals are transmitted in bursts during only half of a cycle in each direction, reflected light has no effect. The disadvantages of TCM are the increase of line bit rate and transmission delay.

It will be appreciated, of course, that to avoid collision of the data bursts as they travel in opposite directions and to switch the single diode at each end between a light-emitting mode and light-detection mode, there must be electrical circuitry connected to the diodes at each end.

Figure 5:
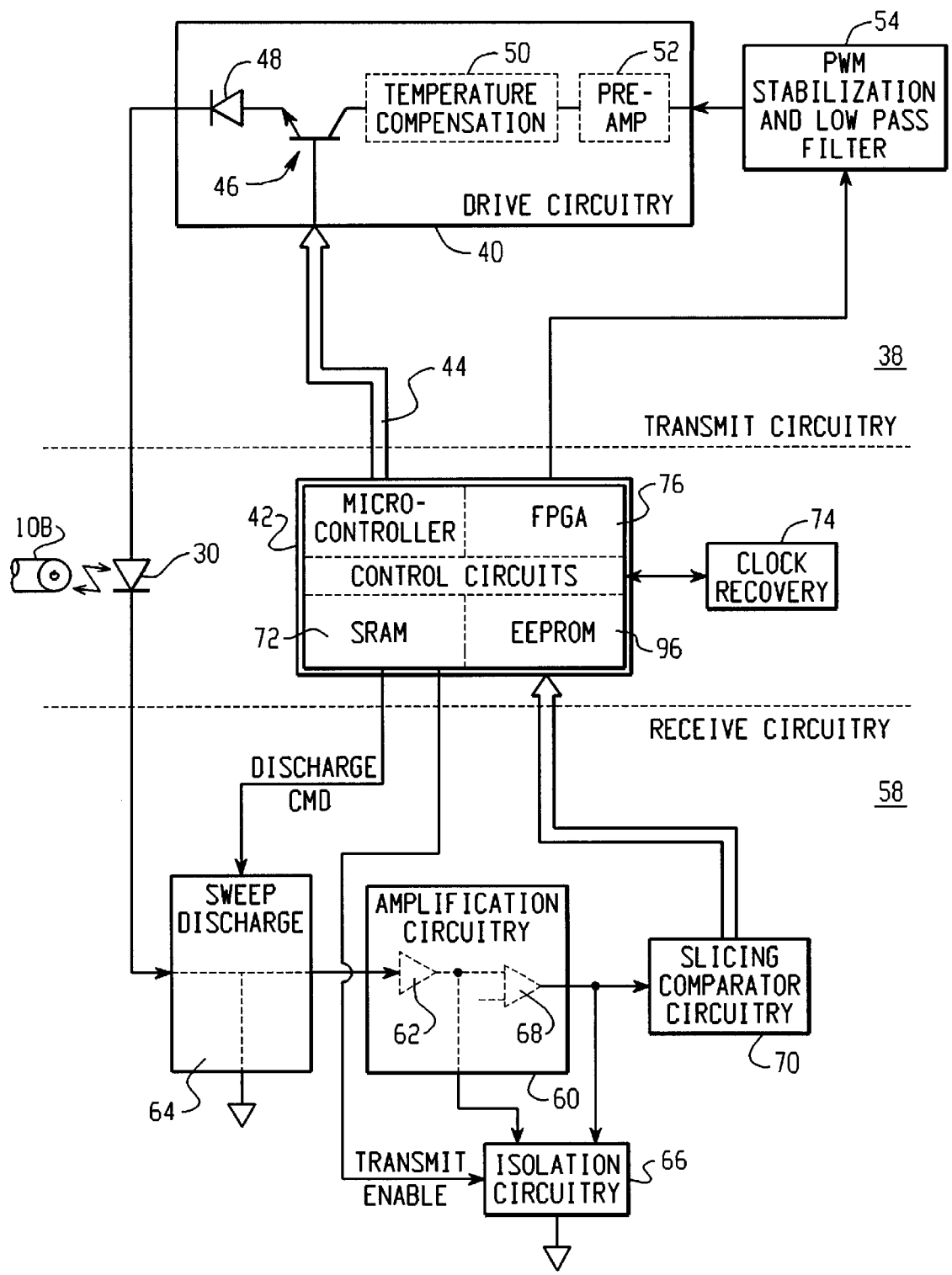
FIG. 5 is a block diagram of electronic circuitry controlling the transmission and receiving of data in a single-fiber and single-diode system which incorporates the teachings of the present invention.
Figure 12:
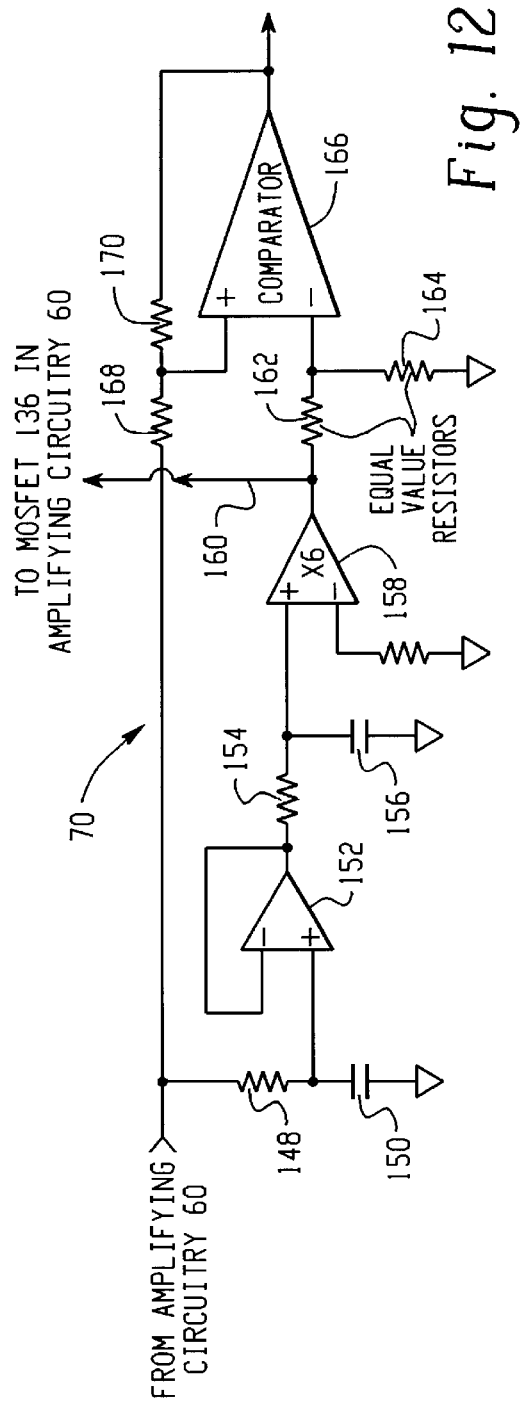

Referring now to FIG. 5, there is shown a block diagram of the diode control circuitry which includes the concepts of this invention.

Since the single diode 30 both transmits light and receives light, TCM time multiplexing is used. Referring to FIG. 6, there is shown a particular timing chart found to be suitable for use with the present invention. As shown, the total cycle time for a complete cycle of transmission and receiving covers 250 microseconds. This 250 microseconds is divided with 82 microseconds being used to transmit data in one direction and another 82 microseconds for receiving a data burst. The remaining 86 microseconds give the optical signals traveling in each direction time to travel the length of the fiber. Of course a similar operation will occur at the other end of the optical fiber. The necessary time windows to avoid collision between data bursts traveling in opposite directions is used to set up the diode circuitry for either the receiving mode or the transmitting mode.

The transmission of data begins by digital signals representing the desired data being provided to drive circuitry 40 from a control circuit 42 by means of data line 44. The data input signal 44 is provided to the base of a drive transistor 46, which then provides a series of data pulses through blocking diode 48 to energize light-emitting diode 30. According to one embodiment, an ELED (edge-emitting LED) has been found to be particularly suitable for use with this invention. As was discussed earlier, the diode will be pulsed ON and OFF in response to the electrical data stream for a time period equal to the data frame, such as for example 82 microseconds. To maintain a substantial constant intensity of the light pulses emitted from diode 30, the transmission circuitry also includes a temperature compensation circuit 50 and a preamplifier 52. To further assure that the output power of the light pulses from the diode 30 are consistent, the voltage level provided to the collector of drive transistor 46 is stabilized by a PWM (pulse-width modulation) voltage stabilizing circuit 54. The PWM stabilizing circuit 54 also receives a reference value from control circuitry 42 (discussed hereafter) to assure the duty cycle of the pulse is correct. The output of the PWM stabilization circuitry 54 is then passed to a low-pass filter in PWM stabilizing circuit 54 prior to being received by the drive circuitry 40. It is seen that not only does the control circuitry 42 provide the electrical data signals which are to be converted to optical data signals, but also provides various control signals to components in the transmission circuitry to maintain a proper power level provided to the emitting diode and another control signal to maintain the duty cycle of the transmission mode.

As discussed earlier, the transmit data bursts continue for 82 microseconds and then rest while the data is transmitted the length of the fiber to the receiving diode. The receiving diode then provides a data burst which, of course, also must travel the full length of the fiber. This down time or quiet time 56, 56A, and 56B as shown in FIG. 5 from the time the transmission ends until the receiver starts receiving light pulses as discussed above is, of course, equal to both the transmitted pulses and the received pulse traveling the full length of the fiber. As described above according to one embodiment, a total time of approximately 86 microseconds is set aside for time periods 56, 56A, and 56B.

Referring now to the receive circuit 58 portion of FIG. 5, it will be appreciated that during the receiving mode the transmitting circuitry 38 must be shut off and isolated from diode 30 since the optical signals received from fiber 10B by diode 30 will be very small. For example, when the diode is receiving light with the maximum attenuation (that is minimum allowable received light), the pulses of current from the diode to the receiving circuitry are on the order of only one microamp peak. The electrical output of diode 30 representative of the optical pulse signals input from fiber optics 10B, is provided to amplification circuitry 60 and more specifically to an operational amplifier 62, which is wired as a transimpedance amplifier. In the embodiment shown, when the transmitter is driving current into the diode 30, the operational amplifier 62 will be driven to saturation. Thus, it would be very difficult to distinguish the data signals coming out of the operational amplifier 62 if nothing is done about this situation. Further, after the transmission circuitry 38 finishes its operation in the transmit mode, it takes a finite time period for the junction of the ELED diode 30 to discharge. To help discharge the junction of the ELED diode 30, there is included according to this invention a sweep discharge circuit 64. This circuit as will be discussed hereinafter helps discharge the junction of diode 30 without at the same time charging it in the opposite polarity, which of course would still leave a charge on the diode. There is also isolation circuitry 66, which disconnects the output of the operational amplifier circuitry 62 and the output of an automatic gain control amplifier 68 to avoid the deleterious effects of the transmission mode on the receive circuitry. The data signals are then provided to a slicing comparator circuitry 70 where the slicing level for the data is determined. The data is then passed to control circuitry 42 and more particularly to an SRAM 72 where it is stored until it is time for use.

Because of the criticality of the timing of the transmit mode, the receive mode, and the rest period, synchronization between the transmit end and the receive end of the optical fiber is, of course, mandatory. Therefore, the circuitry of this invention also includes a clock recovery circuit 74 which regulates the data frames with respect to the frequency oscillator providing the clock pulses.

In addition to the various circuits briefly discussed above, other circuits will also be discussed in the following more detailed descriptions.

Referring now to FIG. 7, there is described the drive circuitry 40 for providing power to the light-emitting diode ELED 30. As shown, the electrical data pulses are provided from the FPGA (field programmable gate array) 76 portion of the control circuitry 42. Electrical pulse signals are provided to the power diode 46 by means of a low-pass filter made up of resistors 78 and 80 and capacitor 82. The output of a power transistor 46 is connected to the blocking diode 48 and resistor 84 prior to being provided to the LED 30. The blocking diode 48 and the resistor 84 help isolate power transistor 46 from the light-emitting diode 30 when the transmitter is OFF so that the receiving sensitivity will not be affected. The transmit power level of the power transistor 46 is controlled by a PWM (pulse-width modulator) located in FPGA (field programmable gate array) 76. The output from FPGA 76 is stabilized by circuitry 54, which will be discussed later. The stabilized voltage from stabilizing circuitry 54 is then provided through amplifier 86 for supplying the drive current necessary for power transistor 46. This amplified stabilized signal is then provided to a temperature compensation circuit comprised of a standard resistor 88 in parallel with a standard resistor 90 and negative temperature coefficient thermistor (NTC) 92. It will be appreciated by those skilled in the art that the resistance of reverse temperature resistor 92 decreases with increasing temperature rather than increasing with temperature as do normal resistors. By use of the reverse temperature resistor, it will be appreciated that ELED 30 will be driven harder at higher temperatures rather than lower temperatures. This is a desirable feature in this circuitry since the optical output intensity of the ELED 30 will drop as the temperature increases.

As was discussed above, a stabilized drive voltage is provided to the current amplifier 86 and the temperature compensation circuitry. Referring now to FIG. 8, the PWM stabilization circuitry 54 will be discussed. The output to the pulse-width modulator is provided from the FPGA 76 which is shown as a part of control circuitry 42. This output is provided as a control signal to the base of PNP transistor 94. The pulse-width modulator as mentioned above is located in the FPGA and is a standard type of modulator, which will not be discussed further except to note that the output pulse width may be selectively programmed in response to an 8-bit number stored in EEPROM 96 also contained in control circuitry 42. The output of the pulse-width is proportion to this 8-bit stored number and that number is programmed into the EEPROM during the manufacturing testing. Thus, during operation, the 8-bit number is read from the EEPROM 96 during the power-up cycle and this sets the output of the pulse-width modulator. Thus, the voltage is stabilized by providing the PWM output voltage to the collector of the PNP transistor 94. A stabilized voltage is provided to the collector of PNP transistor 94 and is generated by means of a zener diode 96 along with resistors 98, 100, and 102 and capacitor 104. The stabilized output from the emitter of the PNP transistor 94 is then provided through a low-pass filter comprised of a resistor 106 and a parallel filter made up of resistor 108 and capacitor 110. This stabilized output is then provided to the drive circuitry amplifier 86 as discussed above.

As was discussed earlier, the ELED diode 30 uses time multiplexing such that the diode can both transmit light and receive light. However, while the circuitry is in the receiving mode, that is the LED 30 is receiving light, as was discussed above, the transmitter must be shut off and isolated from LED 30 since the receive signals are very small. For example, when the circuitry is receiving light in a worst-case situation, the pulses of current from LED 30 may be no greater than about one microamp peak. As was briefly discussed earlier, the output current from LED 30 during the receive mode is converted to a voltage by means of an operational amplifier 62 which is connected so as to act as a transimpedance amplifier having a transimpedance of somewhere around 15K OHMS. During a transmission mode, the drive current supplied to ELED 30 will also drive the operational amplifier 62 to saturation. Thus, in a subsequent receive mode, the saturated operational amplifier 62 must be discharged if the very low current signals from the LED are to be sensed and identified as they pass through operational amplifier 62. Further, after the transmission mode has provided drive power to ELED 30, it also takes a while for the junction of the ELED to discharge. Therefore, the circuitry of FIG. 9 is included according to the present invention to help discharge the junction of ELED 30 without charging the diode to the opposite polarity. To accomplish this, a 100 MV reverse bias pulse is applied to the ELED 30 as soon as the transmission is finished. This is a short pulse such as, for example, approximately fifteen microseconds duration and is formed upon receipt of the pulse through coil 112 applied to the gate of the FET (field effect transistor) 114. The pulse is formed by FET 114 along with the voltage applied through resistors 116 and 118, which are in parallel with capacitor 120 and connected across the source and drain of FET 114. Of course, since ELED diode 30 is connected to the source terminal of FET 114, the momentary discharge pulse allows the charge on ELED 30 to be dissipated. In addition to being connected to the source terminal of FET 114 in sweep discharge circuitry 64, the ELED 30 is also connected to the amplifier 62 of amplification circuitry 60.

As shown in FIG. 10, the output of the ELED 30 is provided to operational amplifier 62. The output of operational amplifier 62 includes the standard feedback circuitry comprised of resistor 122 and capacitor 124. The non-inverting input of operational amplifier 62 is connected through a low-pass filter comprising capacitor 126 and resistor 128 to ground. It is important that this non-inverting input to the transimpedance amplifier 62 not be directly grounded since, when the transmission circuitry drives the ELED 30 and the transimpedance amplifier is driven into saturation, it will not recover quickly if that input is grounded or is connected to too much capacitance. The output of transimpedance amplifier 62 in addition to being connected to the feedback loop discussed above is also connected to isolation circuitry 66 to be discussed later and also through resistor 130 to the input of AGC (automatic gain control) amplifier 68. The output of the automatic gain control amplifier 68 also provides feedback through parallel resistor 132 and capacitor 134. It has been found to be particularly advantageous that AGC amplifier 68 have a maximum gain of not over about 12. It should also be noted that the gain through AGC amplifier 68 is reduced by driving a MOSFET 136 (metal oxide silicon field effect transistor) with a voltage that is twice the "slicing" level. The term "slicing level" is the reference level or output of computer 166, discussed hereinafter. The drain terminal of the MOSFET 136 is connected to ground and, as mentioned above, the gate of the MOSFET 136 is driven by a voltage that is twice the slicing level. Thus, as the signal level from the ELED diode 30 increases, the slicing or reference level increases until the MOSFET starts turning on and reducing the signal level. In the particular preferred embodiment, when the optical signal level reaches about −10 db average, the automatic gain control amplifier 68 will saturate. The amplified gain of the signal from amplifier 68 is then passed through a filtering network composed of coils 138 and 140 along with capacitor 142. It will be noticed that the output of AGC 68 amplifier is also provided to isolation circuitry 66 in the same manner as was the output of amplifier 62. Thus, it will be appreciated that both outputs are provided to an isolation circuit which will now be discussed.

Referring now to FIG. 11, there is shown analog switches 144 and 146 which receive a transmit-enable signal from control circuitry 42. This, of course, means this signal is present when the transmitter is enabled. As shown, the output of transimpedance amplifier 62 and the output of AGC amplifier 68 are both directly connected by analog switches 144 and 146, respectively, to ground when the analog switches 144 and 146 are closed. Thus, when the transmission mode is enabled, these switches are in a closed position. That is, the outputs of amplifiers 62 and 66 are connected to ground. Once the transmitters are no longer enabled, the connection of these amplifier outputs to ground is removed.

After passing through the filter made of coils 138 and 140 and capacitor 142, as discussed in FIG. 10, the output of the amplification circuitry 60 is then provided to slicer or comparator circuitry 70 through a low-pass filter comprised of resister 148, capacitor 150, and amplifier 152. Output filter circuits comprise the resistor 154 and capacitor 156. This amplified and filtered signal is provided to a x6-amplifier 158, which has an output 160 that is used to drive the MOSFET 136 in the automatic gain control circuitry of FIG. 10. Also connected to the output of the x6-amplifier 158 are two resistors 162 and 164 of equal value. Thus, these resistors act as a divide-by-2 circuit with respect to the voltage output from the x6-amplifier. Thus, the drive signal on output 160 provided to the MOSFET 136 which controls the AGC 68 has a voltage that is twice the slicing or reference level of the output of comparator 166, and the slicing level is three times the DC level. The reason that the slicing level is selected to be three times the DC level is that the received pulsing signals from the ELED 30 has a one-third duty-cycle. It should be noted also that DC errors in the transimpedance amplifier 62 and the AGC amplifier 68 are also multiplied by three and can severely limit the sensitivity of the receiver. However, if the transmission enable signal is lengthened so that the only time the receiver is enabled is when the receive signal is present, the effects of the DC errors are substantially eliminated. Thus, the input to the inverting input of the slicing comparator 166 is one-half the output of the x6-amplifier 158 since it has been divided by two or three times the DC reference level. The non-inverting input to slicing comparator 166 is the filtered output received from automatic gain control amplifier 68 by means of resistor 168. As shown, the output of slicing comparator 166 includes a traditional feedback loop through resistor 170. Thus, the output of slicing comparator 166 is provided to control circuit 42 for use as electrical TTL level digital signals.

Figure 13:
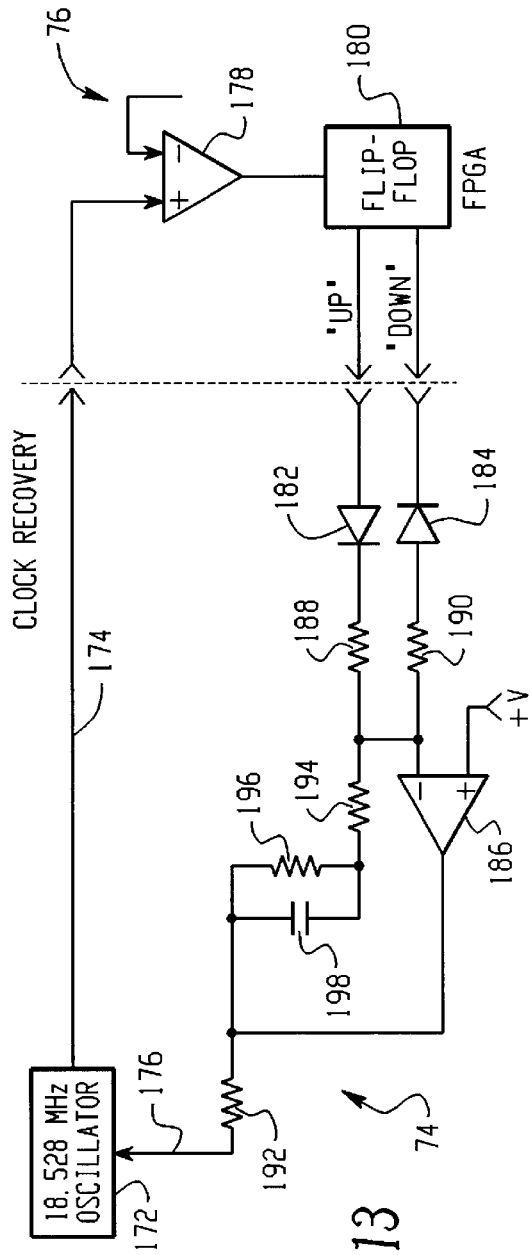

As shown in FIG. 5, clock recovery circuitry 74 is connected to control circuitry 42. Referring to FIG. 13, it can be seen that there are three connections between clock recovery circuitry 74 and control circuitry 42. The connections carry the clocking signal from an oscillator and an "up" signal and a "down" signal. As shown, clock recovery circuitry 74 includes a crystal oscillator 172 which provides output 174 as one of the connections to control circuitry 42. A control signal on line 176 is received by crystal oscillator 172. A particularly satisfactory choice for a crystal oscillator for use with this invention is a crystal oscillator operating at a frequency of 18.528 megahertz as the base frequency. In addition to the oscillator 172, clock recovery circuitry 74 also includes a phase comparator 178 and a flip-flop circuit 180 in the FPGA portion of control circuitry 42. As shown, phase comparator 178 and flip-flop 180 generate a series of up-and-down pulses shown as being received by blocking diodes 182 and 184 from the two outputs of flip-flop 180. The outputs of the blocking diodes 182 and 184 are then provided to the inverting input of an operational amplifier 186 by means of resistors 188 and 190, respectively. The output of operational amplifier 186 is then provided as a control signal 176 through resistor 192 to crystal oscillator 172. A typical feedback circuitry for operational amplifier 186 is also provided by resistor 194 in parallel with resistor 196 and capacitor 198. During operation, the phase comparator 178 in combination with the flip-flop 180 generate the series of up-and-down pulses to the blocking diode 182 and 184 in order to line up the falling edge of the data pulse provided by comparator 166 of comparator circuitry 70 with the falling edge of the clock pulse. When an "up" pulse is generated, the control signal on line 176 to oscillator 172 is increased slightly. On the other hand, when a "down" pulse is generated, the control voltage is reduced slightly. When neither pulse is generated, the control voltage remains the same. Thus, the clock frequency remains stable between the bursts of data. Since the comparator generates an up pulse on every falling edge of the data, the up pulses start on the falling edge of the data and end at the next falling edge of the clock. A down pulse is generated when the clock is high and the data goes low. A down pulse is always one-clock cycle wide. Thus, when the falling clock edge occurs later than the falling data edge, only an "up" pulse is generated and its width is proportional to how far the two edges are apart. If the falling clock edge occurs before the falling data edge, both a one-cycle long "down" pulse is generated and an "up" pulse is generated whose width increases as the edges get closer to each other. Since both a down and an up pulse are generated, the net effect is that the crystal oscillator control voltage is reduced proportionally for the time from the clock edge to the data edge. Once the falling edge of the clock is locked to the falling edge of the data, the rising edge of the clock will occur in the middle of the data. Thus, the simple flip-flop 180 is used to re-time the data and the recovered 18.528 MHZ clock is the clock used as the system clock for this invention. The clock will be provided even if the optical link is lost, and no data pulses are available for comparison.

The corresponding structures, materials, acts, and equivalents of all means or step plus function elements in the claims below are intended to include any structure, material or act for performing the function in combination with other claimed elements as specifically claimed.

We claim:

1. Circuitry connected to an optical fiber for receiving and transmitting digital signals comprising:
    a source of electrical digital signals;
    an optical fiber having a receiving mode and a transmitting mode suitable for transmitting digital light signals therethrough;
    a diode optically coupled to said optical fiber for receiving digital light signals from said optical fiber in said receive mode and generating electrical digital signals representative of said digital light signals, and said diode electrically connected to said electrical digital signal source for receiving said electrical digital signals in said transmit mode and generating optical digital light signals representative of said electrical digital signals for transmitting by said optical fiber;
    receiving circuitry connected to said diode for receiving said electrical digital signals from said diode and for providing digital output signal, said receiving circuitry comprising amplifying circuitry including first and second amplifiers;
    first isolation circuitry for isolating said source of electrical digital signals from said diode;
    sweep circuitry for removing residual charge from said diode subsequent to said transmission mode and prior to receiving said digital light signals; and
    second isolation circuitry comprising a switching circuit for disconnecting said amplifying circuitry during said transmission mode by grounding the outputs of the first and second amplifiers.

2. The circuitry of claim 1 wherein said second amplifier is an AGC (automatic gain control) amplifier.

3. The circuitry of claim 1 and further comprising a slicing comparator for calculating the slicing level of the output signal.

4. The circuitry of claim 1 and further comprising a drive circuit for receiving digital input signals and providing said electrical digital signals to drive said diode.

5. The circuitry of claim 4 and further comprising a temperature compensation circuit for maintaining the output level of said drive circuit within acceptable levels in response to temperature variations.

6. The circuitry of claim 4 wherein said digital input signal is a PWM (pulse-width modulated) signal and further comprises circuitry for conditioning said PWM digital input signal.

7. The circuitry of claim 6 wherein said conditioning circuitry further comprises a voltage regulator for stabilizing the voltage level of the PWM signal and wherein the duty cycle of the PWM signal is proportional to a value stored in a read only memory.

8. The circuitry of claim 7 wherein said read-only memory is an EEPROM (electrically erasable programmable read-only memory).

9. The circuitry of claim 1 and further comprising a frequency oscillator for providing clock pulses and a clock recovery circuit for synchronizing the falling edge of a data pulse with the falling edge of a clock pulse.

10. The circuitry of claim 9 wherein said clock recovery circuitry includes a phase comparator for providing a control signal to said frequency oscillator.

11. The circuitry of claim 1 wherein said diode is an ELED (edge-emitting light-emitting diode).

12. The circuitry of claim 1, wherein said sweep circuitry for removing residual charge from said diode subsequent to said transmission mode and prior to receiving said digital light signals discharges the junction of the diode without charging the diode to an opposite polarity.

13. The circuitry of claim 1 wherein said sweep circuitry applies a 100 mV reverse bias pulse to discharge the junction of the diode.

14. The circuitry of claim 13 wherein said reverse bias pulse has a duration of 15 microseconds.

15. Circuitry connected to an optical fiber for receiving and transmitting digital signals comprising:
    a source of electrical digital signals;
    an optical fiber having a receiving mode and a transmitting mode suitable for transmitting digital light signals therethrough;

a diode optically coupled to said optical fiber for receiving digital light signals from said optical fiber in said receive mode and generating electrical digital signals representative of said digital light signals, and said diode electrically connected to said electrical digital signal source for receiving said electrical digital signals in said transmit mode and generating optical digital light signals representative of said electrical digital signals for transmitting by said optical fiber;

receiving circuitry connected to said diode for receiving said electrical digital signals from said diode and for providing digital output signal, said receiving circuitry comprising amplifying circuitry;

first isolation circuitry for isolating said source of electrical digital signals from said diode; and sweep circuitry for removing residual charge from said diode subsequent to said transmission mode and prior to receiving said digital light signals;

wherein said transmission mode is extended so that said receive circuitry is enabled when a receive signal is present.

16. Circuitry connected to an optical fiber for receiving and transmitting digital signals comprising:

a source of electrical digital signals;

an optical fiber having a receiving mode and a transmitting mode suitable for transmitting digital light signals therethrough;

a diode optically coupled to said optical fiber for receiving digital light signals from said optical fiber in said receive mode and generating electrical digital signals representative of said digital light signals, and said diode electrically connected to said electrical digital signal source for receiving said electrical digital signals in said transmit mode and generating optical digital light signals representative of said electrical digital signals for transmitting by said optical fiber;

receiving circuitry connected to said diode for receiving said electrical digital signals from said diode and for providing digital output signal, said receiving circuitry comprising amplifying circuitry;

first isolation circuitry for isolating said source of electrical digital signals from said diode;

sweep circuitry for removing residual charge from said diode subsequent to said transmission mode and prior to receiving said digital light signals; and second isolation circuitry comprising a switching circuit for disconnecting said amplifying circuit during said transmission mode;

wherein said switching circuit for disconnecting said amplifying circuit during said transmission mode grounds said amplifying circuit during said transmission mode.

17. The circuitry of claim 16, wherein said transmission mode is extended so that said receive circuitry is enabled when a receive signal is present.

18. Circuitry connected to an optical fiber for receiving and transmitting digital signals comprising:

a source of electrical digital signals;

an optical fiber having a receiving mode and a transmitting mode suitable for transmitting digital light signals therethrough;

a diode optically coupled to said optical fiber for receiving digital light signals from said optical fiber in said receive mode and generating electrical digital signals representative of said digital light signals, and said diode electrically connected to said electrical digital signal source for receiving said electrical digital signals in said transmit mode and generating optical digital light signals representative of said electrical digital signals for transmitting by said optical fiber;

receiving circuitry connected to said diode for receiving said electrical digital signals from said diode and for providing digital output signal;

first isolation circuitry for isolating said source of electrical digital signals from said diode; and sweep circuitry for removing residual charge from said diode subsequent to said transmission mode and prior to receiving said digital light signals;

wherein said first isolation circuitry comprises a blocking diode and a grounded resistor coupled to the blocking diode, said blocking diode interposed between the diode and said electrical digital signal source.

* * * * *